(12) United States Patent
Knoedgen

(10) Patent No.: US 10,122,252 B2
(45) Date of Patent: Nov. 6, 2018

(54) SUPPLY VOLTAGE MANAGEMENT

(71) Applicant: Dialog Semiconductor GmbH, Kirchheim/Teck-Nabem (DE)

(72) Inventor: Horst Knoedgen, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 7 days.

(21) Appl. No.: 14/707,730

(22) Filed: May 8, 2015

(65) Prior Publication Data

US 2015/0244248 A1    Aug. 27, 2015

Related U.S. Application Data

(63) Continuation of application No. PCT/EP2013/057880, filed on Apr. 16, 2013.

(30) Foreign Application Priority Data

Nov. 15, 2012  (EP) .................................. 12192786

(51) Int. Cl.
*H05B 37/02*    (2006.01)
*H05B 39/04*    (2006.01)
(Continued)

(52) U.S. Cl.
CPC .......... *H02M 1/08* (2013.01); *H02M 3/33507* (2013.01); *H05B 33/0815* (2013.01);
(Continued)

(58) Field of Classification Search
CPC ..... H05B 41/24; H05B 33/0815; F02P 3/0884
(Continued)

(56) References Cited

U.S. PATENT DOCUMENTS

| 2008/0018261 | A1  | 1/2008 | Kastner  |           |
|---|---|---|---|---|
| 2011/0228565 | A1* | 9/2011 | Griffin  | H02M 1/36 |
|              |     |        |          | 363/21.01 |
| 2012/0056551 | A1* | 3/2012 | Zhu      | H02M 1/4258 |
|              |     |        |          | 315/232   |
| 2012/0112638 | A1* | 5/2012 | Melanson | H05B 33/0854 |
|              |     |        |          | 315/117   |

FOREIGN PATENT DOCUMENTS

WO    WO 2011/137646    11/2011

OTHER PUBLICATIONS

Chinese Office Action, Application No. 201380053646.X, Applicant: Dialog Semiconductor GmbH, dated Apr. 29, 2016, 6 pgs., and English languagetranslation, 5 pgs.
(Continued)

*Primary Examiner* — Alexander H Taningco
*Assistant Examiner* — Christian L Garcia
(74) *Attorney, Agent, or Firm* — Saile Ackerman LLC; Stephen B. Ackerman

(57) ABSTRACT

A method for the start-up and/or the maintenance of a supply voltage for a driver circuit for a solid state light source is described. The driver circuit comprises a switched-mode power converter with a switch and a transformer. The switched-mode power converter converts an input voltage into an output voltage. The driver circuit has a controller which generates a gate control signal for putting the power converter switch into an on-state or an off-state. The driver circuit comprises a supply voltage capacitor to provide a voltage to the controller. A primary coil of the transformer is arranged in series with the power converter switch. A secondary coil arrangement of the transformer provides the output voltage. and is coupled to the supply voltage capacitor via a supply voltage transistor which is controlled such that the supply voltage provided by the supply voltage capacitor lies within a pre-determined voltage interval.

27 Claims, 11 Drawing Sheets

(51) Int. Cl.
  *H05B 41/36* (2006.01)
  *H02M 1/08* (2006.01)
  *H05B 33/08* (2006.01)
  *H02M 3/335* (2006.01)
  *H05B 41/24* (2006.01)
  *F02P 3/08* (2006.01)
  *H02M 1/00* (2006.01)

(52) U.S. Cl.
  CPC ........ *H05B 33/0845* (2013.01); *F02P 3/0884* (2013.01); *H02M 2001/0048* (2013.01); *H05B 41/24* (2013.01); *Y02B 20/346* (2013.01)

(58) Field of Classification Search
  USPC ............ 315/223, 219, 209 R, 224, 206, 226; 361/270; 363/37
  See application file for complete search history.

(56) References Cited

OTHER PUBLICATIONS

European Search Report, dated Jun. 28, 2013, Applicant Dialog Semiconductor GmbH, Application No. 12192786.7-1802.

Communication pursuant to Article 94(3)EPC, Application No. 12 192 786.7-1802, Ref. No.:203450EP, dated Feb. 3, 2017, Applicant: Dialog Semiconductor GmbH, 6 pgs.

Communication from EPC, Application No: 12 192 786.7-1802, Applicant: Dialog Semiconductor Gmbh, dated Jul. 27, 2017, 7 pgs.

Communication pursuant to Article 94(3) EPC, Applicant: Dialog Semiconductor GmbH, Application No. 12 192 786.7-1204, dated Feb. 8, 2018, 7 pages.

\* cited by examiner

SUPPLY VOLTAGE MANAGEMENT

TECHNICAL FIELD

The present document relates to a driver circuit for a solid state light source. In particular, the present document relates to the start-up and/or the maintenance of a supply voltage for the integrated circuit of a driver circuit.

BACKGROUND

The start-up of a driver circuit of a light bulb assembly, notably the start-up of a controller chip of the driver circuit, subsequent to turning on the mains power supply to the light bulb assembly typically requires additional components for the driver circuit. The additional components contribute to overall power losses and additional material costs of the driver circuit. Especially when used in conjunction with phase-cut dimmers, the power supply of the controller chip typically requires relatively high capacitance values of a supply voltage capacitor in order to maintain a smooth and a stable supply voltage Vcc at any time. The use of high capacitances may cause longer start-up times or may lead to the use of higher start-up currents. This may degrade the system efficiency and may lead to increased costs for the start-up resistors.

SUMMARY

The present document addresses the above mentioned technical issues related to the start-up and the maintenance of a supply voltage for the integrated circuit (IC), e.g. the controller, of a driver circuit. According to an aspect, a driver circuit for a solid state light source (e.g. an LED or OLED light source) is described. The driver circuit may be configured to supply energy taken from a mains supply to the light source. The light source may e.g. be provided with a drive voltage and a drive current generated by the driver circuit. The drive voltage may e.g. correspond to an on-voltage of the solid state light source. The drive current may be used to control the illumination level of the light source.

The driver circuit may comprise a switched-mode power converter comprising a power converter switch. The power converter may comprise one or more of: a flyback converter, a buck converter, a boost converter, a buck-boost converter, and a single-ended primary-inductor converter. In more general terms, the power converter may comprise or may be an inductor-based power converter. The power converter switch may comprise a transistor, e.g. a metal oxide semiconductor field effect transistor. The switched-mode power converter may be configured to convert an input voltage at an input of the switched-mode power converter into an output voltage at an output of the switched-mode power converter. The output voltage may e.g. correspond to the drive voltage which is provided to the light source.

The driver circuit may comprise a controller configured to generate a gate control signal for putting the power converter switch into an on-state and/or an off-state. The controller may be implemented as an integrated circuit (IC). The power converter switch may alternate between succeeding on-states and off-states, thereby forming succeeding on-periods and off-periods. An on-period and a succeeding off-period may be referred to as a commutation cycle. The controller may operate the power converter switch at a commutation cycle rate (in the range of 100 kHz) and at a duty cycle (specifying a ratio between the duration of an on-period and the duration of the commutation cycle).

The driver circuit may comprise a supply voltage capacitor coupled to the controller and configured to provide a supply voltage to the controller. The supply voltage capacitor may be charged with electrical energy which may be used for the operation of the controller. The supply voltage should typically lie within a pre-determined voltage interval, in order to ensure a reliable and safe operation of the controller.

As indicated above, the switched-mode power converter may comprise an inductor. In particular, the switched-mode power converter may comprise a transformer. A primary coil of the transformer may be arranged in series with the power converter switch. As such, the power converter switch may control a current through the primary coil. The current through the primary coil may e.g. be measured using current sensing means comprising e.g. a shunt resistor arranged in series with the power converter switch and with the primary coil.

Furthermore, the transformer may comprise a secondary coil arrangement which is configured to provide the output voltage. The primary coil and the secondary coil arrangement may be coupled in an electromagnetic manner. The secondary coil arrangement may comprise a secondary coil. The primary coil, the secondary coil and the power converter switch may be part of a flyback converter. In particular, the secondary coil may be arranged in series with a secondary switch, e.g. a secondary diode, such that the secondary coil is operated in a flyback mode with respect to the primary coil. This may be achieved by appropriately selecting the respective polarity of the primary and secondary coils and the biasing direction of the secondary diode.

Furthermore, the secondary coil arrangement may be coupled to the supply voltage capacitor via a supply voltage transistor (also referred to herein as a supply voltage switch). The secondary coil arrangement may comprise an auxiliary coil which is coupled to the supply voltage capacitor via the supply voltage transistor. The primary coil and the auxiliary coil of the transformer may be coupled in an electromagnetic manner. The supply voltage transistor or switch may be an internal power switch of the controller. In particular, the auxiliary coil may be coupled to a first pin of the controller (e.g. a controller chip) and the supply voltage capacitor may be coupled to a second pin of the controller. The first and second pins of the controller may be coupled internally of the controller via the internal supply voltage transistor.

The supply voltage transistor may be operated in a linear mode, such that the supply voltage transistor exhibits a current limiting and adjustable on-resistance. Alternatively or in addition, the supply voltage transistor may be arranged in series with a current limiting resistor or some other current limiting components in order to limit the current to the supply voltage capacitor. By doing this a current peak towards the supply voltage capacitor can be avoided.

The supply voltage transistor may be controlled such that the supply voltage provided by the supply voltage capacitor lies within a pre-determined voltage interval. The pre-determined voltage interval may be such that it ensures a reliable and safe operation of the controller and/or of the driver circuit. The driver circuit may comprise voltage sensing means (e.g. a voltage divider, possibly internal to the controller) which are configured to provide an indication of the voltage drop across the supply voltage capacitor, i.e. an indication of the supply voltage. The signal provided by the voltage sensing means may be referred to as the sensed voltage signal. The controller may be configured to close the supply voltage transistor (and to thereby recharge the supply voltage capacitor) when the sensed voltage signal reaches a lower voltage threshold, and the controller may be configured to open the supply voltage transistor (and to thereby interrupt the recharging of the supply voltage capacitor) when the sensed voltage signal reaches a higher voltage threshold. The lower and high voltage thresholds typically lie within or define the pre-determined voltage interval.

As such, the transformer (and in particular the auxiliary coil) may be used to provide and maintain the supply voltage via a supply voltage transistor. The supply voltage transistor may be controlled to maintain the supply voltage within the pre-determined voltage interval, thereby ensuring a reliable and safe operation of the driver circuit. Furthermore, the auxiliary coil and the supply voltage transistor ensure an energy efficient maintenance of the supply voltage. In addition, the auxiliary coil may also be used for measurement purposes (e.g. for measuring the current through the power converter switch), thereby reducing the number of components of the driver circuit.

The auxiliary coil may be arranged in series with an auxiliary switch, e.g. an auxiliary diode, such that the auxiliary coil is operated in a forward mode with respect to the primary coil. This may be achieved by an appropriate selection of the respective polarity of the primary and auxiliary coils and of the biasing direction of the auxiliary diode. If the auxiliary coil is operated in a forward mode and the secondary coil is operated in a flyback mode, the current (referred to as the IC current) to the supply voltage capacitor (provided by the auxiliary coil) is provided during the on-period of the power converter switch, whereas the current (referred to as the LED current) to the light source (provided by the secondary coil) is provided during the off-period of the power converter switch, thereby ensuring that the IC current does not impact the LED current. On the other hand, the current through the power converter switch during the on-period of the power converter switch is typically offset by the additional IC current. This offset may impact the regulation of the power converter switch, thereby impacting the LED current.

Alternatively, the auxiliary coil may be arranged in series with the auxiliary switch, e.g. the auxiliary diode, such that the auxiliary coil is operated in a flyback mode with respect to the primary coil. If the auxiliary coil is operated in a flyback mode and the secondary coil is also operated in a flyback mode, the IC current and the LEC currents are provided during the off-period of the power converter switch. As such, the IC current typically impacts the LED current.

Hence, the provisioning of an IC current to the supply voltage capacitor via the auxiliary coil typically impacts (directly or indirectly) the LED current. The driver circuit may be configured to compensate these effects, thereby ensuring the provisioning of a stable LED current (i.e. thereby avoiding flickering effects). In particular, the controller may be configured to control the power converter switch to be in alternating on-periods (where the power converter switch is in on-state) and off-periods (where the power converter switch is in off-state). Furthermore, the controller may be configured to control the supply voltage transistor to be in off-state (i.e. open) at least for every second on-period of the power converter switch. In other words, the controller may be configured to keep the supply voltage transistor open during at least some of the on-periods of the power converter switch. The on-periods during which the supply voltage transistor is kept open may be referred to as the undistorted on-periods. The undistorted on-periods may be used to determine a duration of the on-period of the power converter switch for providing a stable LED current. In other words, the switched-mode power converter may be regulated (i.e. the gate control signal may be determined) based on measurements performed during the undistorted on-periods. Measurements performed during on-periods when the supply voltage transistor is closed may be ignored. By doing this, it can be ensured that the additional IC current does not impact the LED current. In particular, it can be ensured that the power converter is controlled such that an additional IC current can be provided without impacting the provisioning of the LED current.

As indicated above, the controller may be configured to generate the gate control signal for putting the power converter switch into the on-state and the off-state in an alternating manner. The driver circuit may comprise current sensing means configured to sense a current through the auxiliary coil, thereby yielding an auxiliary signal. The auxiliary signal may be indicative of the current through the power converter switch (notably if the auxiliary coil is operated in a forward mode). Furthermore, the controller may be configured to determine a duration of the on-period of the power converter switch based on the auxiliary signal. In particular, the controller may be configured to determine the duration of the on-period based on a pre-determined peak current. By way of example, the power converter switch may be kept in on-state until the auxiliary signal reaches the pre-determined peak current, thereby providing the duration of the on-period.

As indicated above, the current through the power converter switch (i.e. the auxiliary signal) may be offset by the additional IC current. By consequence, the determined duration of the on-period may be impacted by the additional IC current. In particular, the determined duration of the on-period may be too short for supplying a stable LED current (and a stable output voltage of the power converter). The controller may be configured to control the supply voltage transistor in a switched mode to be open or closed. Furthermore, the controller may be configured to determine the auxiliary signal at a first time interval, when the supply voltage transistor is open (e.g. during an undistorted on-period of the power converter switch). In addition, the controller may be configured to determine a first duration of the on-period of the power converter switch based on the auxiliary signal at the first time interval. Furthermore, the controller may be configured to maintain the power converter switch in on-state for the first duration at a succeeding second time interval, when the supply voltage transistor is closed. In other words, the controller may be configured to determine the duration of the on-periods of the power converter switch at time intervals when the supply voltage transistor is open, thereby ensuring that the determined duration of on-periods is not impacted by the additional IC current. The determined duration of on-periods may also be applied to time intervals when the supply voltage transistor is closed (i.e. when an additional IC current is drawn). By doing this, it can be ensured that a stable LED current is provided, even during time intervals when the supply voltage transistor is closed (i.e. when an additional IC current is drawn).

As indicated above, the transformer may comprise a secondary coil arrangement. The secondary coil arrangement may comprise galvanically decoupled secondary and auxiliary coils. By doing this, a galvanic isolation between the current provided to the light source and the current provided to the supply voltage capacitor can be ensured. It should be noted that the same coil (e.g. the secondary coil)

can be used for providing the current to the light source and the current to the supply voltage capacitor.

The driver circuit may further comprise a discharging transistor arranged in series with the auxiliary coil and configured to discharge a parasitic capacitance. The discharging transistor may be arranged in series to a current limiting resistor. The discharging transistor (also referred to a discharging switch) may be an internal transistor of the controller. The discharging transistor may be controlled to provide for a fast discharge of the parasitic capacitors at the input of the controller, if the load is not high enough. Additionally, by modulation of the serial resistor (which can also be a programmable current source) the LED current can be modulated e.g. for low dimming levels. In other words, by modulating the current limiting resistor in series with the discharging transistor, a current drawn from the auxiliary coil can be modulated which typically impacts the current provided to the light source. As such, the current provided to the light source may be modulated (notably when the auxiliary coil and the secondary coil are operated in flyback mode). The load may be independent of the supply voltage transistor.

The driver circuit may further comprise a start-up resistor configured to couple the input of the switched-mode power converter to the supply voltage capacitor. By way of example, the start-up resistor may be coupled to a third pin of the controller and the supply voltage capacitor may be coupled to the second pin of the controller. The third pin and the second pin may be linked within the controller via a start-up diode which is biased to prevent a discharging of the supply voltage capacitor towards the start-up resistor.

Furthermore, the driver circuit may comprise a start-up switch and a measurement resistor arranged in parallel to the supply voltage capacitor (and the start-up diode) such than when the start-up switch is closed, the start-up resistor and the measurement resistor form a voltage divider. The start-up switch may be an internal power switch of the controller. As such, when the start-up switch is open, the start-up resistor may be used to charge the supply voltage capacitor. On the other hand, when the start-up switch is closed, the start-up resistor may be used for measurement purposes, e.g. for measuring the input voltage of the power converter.

The driver circuit may further comprise an output capacitor at the output of the switched-mode power converter, configured to store an electrical charge to be provided to the solid state light source. The output capacitor is typically arranged in parallel to the output voltage. The driver circuit may be configured to transfer electrical energy from the primary coil of the switched-mode power converter via the secondary coil to the output capacitor during the off-period of the power converter switch. Furthermore, the driver circuit may be configured to store energy drawn from a mains supply within the primary coil during the on-period of the power converter switch.

The controller may be configured to receive the auxiliary signal (e.g. via the first pin of the controller). The auxiliary signal may be indicative of a voltage drop at the auxiliary coil and/or of the current through the primary coil. The controller may comprise a rectification unit configured to rectify the auxiliary signal. By way of example, the rectification unit may comprise the auxiliary switch or auxiliary diode. As such, the auxiliary diode may be implemented within the controller. The rectification unit may comprise a half wave rectifier (such as a diode) or a full wave rectifier. In particular, the rectification unit may comprise a plurality of rectification switches configured to switch an operational mode of the auxiliary coil with respect to the primary coil between a flyback mode and a forward mode. As such, the controller may be configured to control the operational mode of the auxiliary coil. The change of the operational mode can be performed on the fly. The fly back mode for the Vcc supply may be used as a dimming function (LED current-IC current) for low level. The duty cycle of the supply voltage transistor may be used to control the dim level. Notably when operating the auxiliary coil in flyback mode, the IC current drawn from the auxiliary coil may be used to modulate the LED current provided to the light source. A duty cycle of the supply voltage transistor may be used to control the illumination level of the light source (via the current provided to the light source).

Furthermore, the controller may comprise a voltage divider, typically arranged in parallel to the supply voltage transistor and the supply voltage capacitor, and configured to sense the auxiliary signal, when the supply voltage transistor is open. As such, the supply voltage transistor may be used to switch between a recharging of the supply voltage capacitor and a measurement of the auxiliary signal (for controlling the power converter switch).

According to a further aspect, a light bulb assembly is described. The light bulb assembly comprises a housing and a solid state light emitting device, located within the housing. Furthermore, the light bulb assembly may comprise an electrical connection module, attached to the housing, and adapted for connection to a mains supply. In addition, the light bulb assembly may comprise a driver circuit according to any of the aspects outlined in the present document, located within the housing, connected to receive an electricity supply signal from the electrical connection module, and operable to supply an output voltage to the light emitting device.

According to another aspect, a method for providing (e.g. for recharging) a supply voltage is described. The method may comprise the step of providing a switched-mode power converter comprising a power converter switch and a transformer. The switched-mode power converter is typically configured to convert the input voltage at the input of the switched-mode power converter into the output voltage at the output of the switched-mode power converter. The method may comprise the step of generating a gate control signal for putting the power converter switch into an on-state and/or an off-state. Furthermore, the method may comprise the step of providing the supply voltage capacitor. The primary coil of the transformer may be arranged in series with the power converter switch. The secondary coil of the transformer may be configured to provide the output voltage. The auxiliary coil of the transformer may be coupled to the supply voltage capacitor via a supply voltage transistor. The method may comprise the step of controlling the supply voltage transistor such that the supply voltage provided by the supply voltage capacitor lies within a pre-determined voltage interval.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

In the present document, a light bulb "assembly" includes all of the components required to replace a traditional incandescent filament-based light bulb, notably light bulbs for connection to the standard electricity supply. In British English (and in the present document), this electricity supply is referred to as "mains" electricity, whilst in US English, this supply is typically referred to as power line. Other terms include AC power, line power, domestic power and grid power. It is to be understood that these terms are readily interchangeable, and carry the same meaning.

Typically, in Europe electricity is supplied at 230-240 VAC, at 50 Hz (mains frequency) and in North America at 110-120 VAC at 60 Hz (mains frequency). The principles set out in the present document apply to any suitable electricity supply, including the mains/power line mentioned, and a DC power supply, and a rectified AC power supply.

Figure 1:
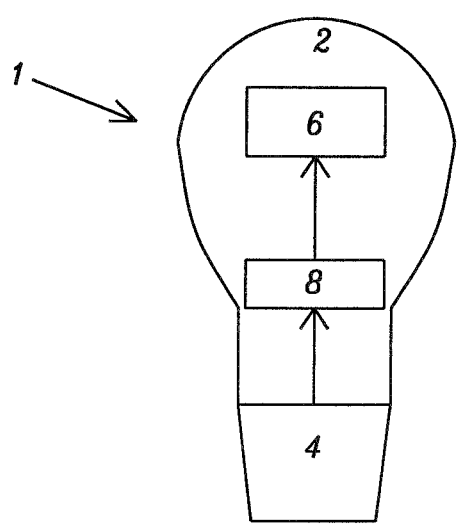
FIG. 1 illustrates a block diagram of an example light bulb assembly.

FIG. 1 is a schematic view of a light bulb assembly. The assembly 1 comprises a bulb housing 2 and an electrical connection module 4. The electrical connection module 4 can be of a screw type or of a bayonet type, or of any other suitable connection to a light bulb socket. Typical examples for an electrical connection module 4 are the E11, E14 and E27 screw types of Europe and the E12, E17 and E26 screw types of North America. Furthermore, a light source 6 (also referred to as an illuminant) is provided within the housing 2. Examples for such light sources 6 are a CFL tube or a solid state light source 6, such as a light emitting diode (LED) or an organic light emitting diode (OLED) (the latter technology is referred to as solid state lighting, SSL). The light source 6 may be provided by a single light emitting device, or by a plurality of LEDs.

Driver circuit 8 is located within the bulb housing 2, and serves to convert supply electricity received through the electrical connection module 4 into a controlled drive current for the light source 6. In the case of a solid state light source 6, the driver circuit 8 is configured to provide a controlled direct drive current to the light source 6.

The housing 2 provides a suitably robust enclosure for the light source and drive components, and includes optical elements that may be required for providing the desired output light from the assembly. The housing 2 may also provide a heat-sink capability, since management of the temperature of the light source may be important in maximising light output and light source life. Accordingly, the housing is typically designed to enable heat generated by the light source to be conducted away from the light source, and out of the assembly as a whole.

Figure 2:
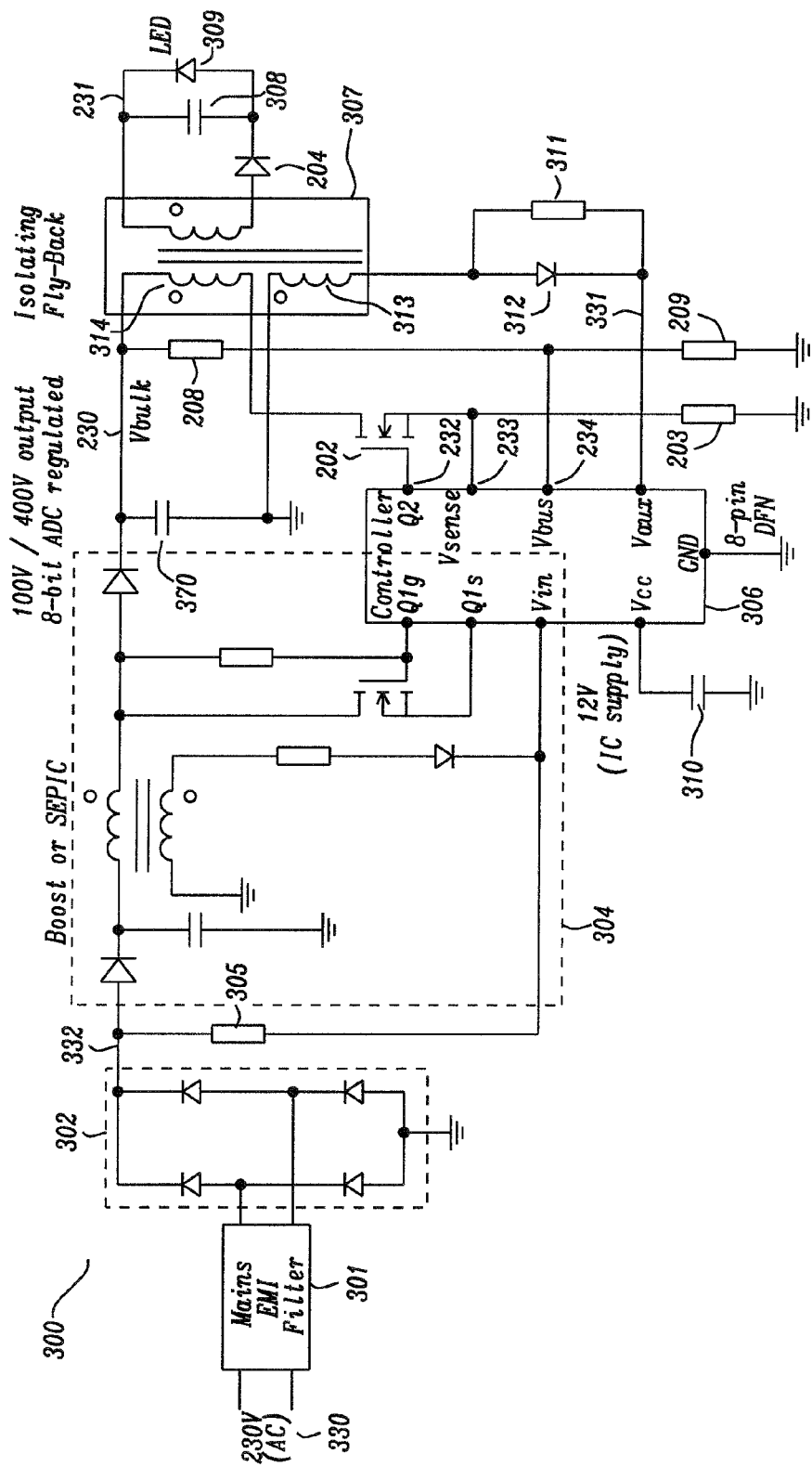
FIG. 2 shows a circuit diagram of an example driver circuit.

FIG. 2 shows a circuit diagram of an example driver circuit 300, 8 of a light bulb assembly 1. The driver circuit 300 comprises an electromagnetic interference (EMI) filter unit 301 and a rectifier 302, in order to generate a rectified voltage from the mains supply 330. Furthermore, the driver circuit 300 comprises a controller 306 which is configured to control a two-stage power converter. The controller 306 may be started using the start-up resistor 305 coupled to the rectified voltage from the mains supply 330. Furthermore, the controller may be coupled to a supply voltage capacitor 310 configured to provide the supply voltage Vcc to the controller 306 (which may be implemented e.g. as an integrated circuit, IC). In the illustrated example, the driver circuit 300 comprises a two-stage power converter with the first stage being a Boost converter 304 and the second stage being a flyback converter.

The flyback converter of FIG. 3 comprises a switch 202 (also referred to as the power converter switch) which is controlled via a gate control signal 232 generated by the controller 306. The switch 202 may be operated in a switched mode comprising an alternation of on-states and off-state. The flyback converter may be configured to store energy coming from an input of the flyback converter (with an input voltage 230) in an inductor during an on-state of the switch 202. In the case of a flyback converter, the inductor is implemented as a transformer 307 comprising a primary coil 314 and a secondary coil 315. Typically, the flyback converter is configured to transfer the stored energy from the primary coil 314 to the secondary coil 315 during an off-state of the switch 202 and to thereby recharge an output capacitor 308. The output capacitor 308 is arranged at the output of the flyback converter and provides an output voltage 231 to the light source 309, 6. The flyback converter may comprise a diode 204 (also referred to as the secondary diode) which is configured to prevent a discharging of the output capacitor 308 during the on-state of the switch 202.

The transformer 307 of driver circuit 300 comprises an auxiliary coil or winding 313 which may be used for measurement purposes. The auxiliary winding 313 may be used to provide information to the controller 306 regarding the output voltage 231 of the driver circuit 300 and/or regarding the input voltage 230 of the flyback converter. The auxiliary coil 313 may be coupled to the controller 306 via an auxiliary diode 312 arranged in parallel to an auxiliary resistor 311 in order to provide the auxiliary signal 331 to the controller 306. The auxiliary signal 331 may be indicative of the output voltage 231 of the driver circuit 300 and/or of the input voltage 230 of the flyback converter, depending on the state of the switch 202. When the switch 202 is in the on-state, the auxiliary signal 331 may be indicative of the input voltage 230 and/or of the current through the primary coil 314. On the other hand, when the switch 202 is in off-state, the auxiliary signal 331 may be indicative of the output voltage 231.

In the driver circuit 300 of FIG. 2 the input voltage 230 to the second converter stage is sensed using input voltage sensing means 208, 209 (e.g. a voltage divider comprising resistors 208 and 209), thereby providing a sensed voltage signal 234 which is indicative of (e.g. proportional to) the input voltage 230. Furthermore, a sensed current signal 233 may be determined using current sensing means 203 (comprising e.g. the shunt resistor 203). The sensed current signal 233 is indicative of the current through the switch 202 of the second converter stage. The controller 306 may be configured to determine a gate control signal 232 for putting the switch 202 of the second converter stage into an off-state and/or an on-state based on the sensed current signal 233 and/or based on the sensed input voltage 234. Furthermore, the controller 306 may take into account the auxiliary signal 331 for generating the gate control signal 232.

Figure 3A:
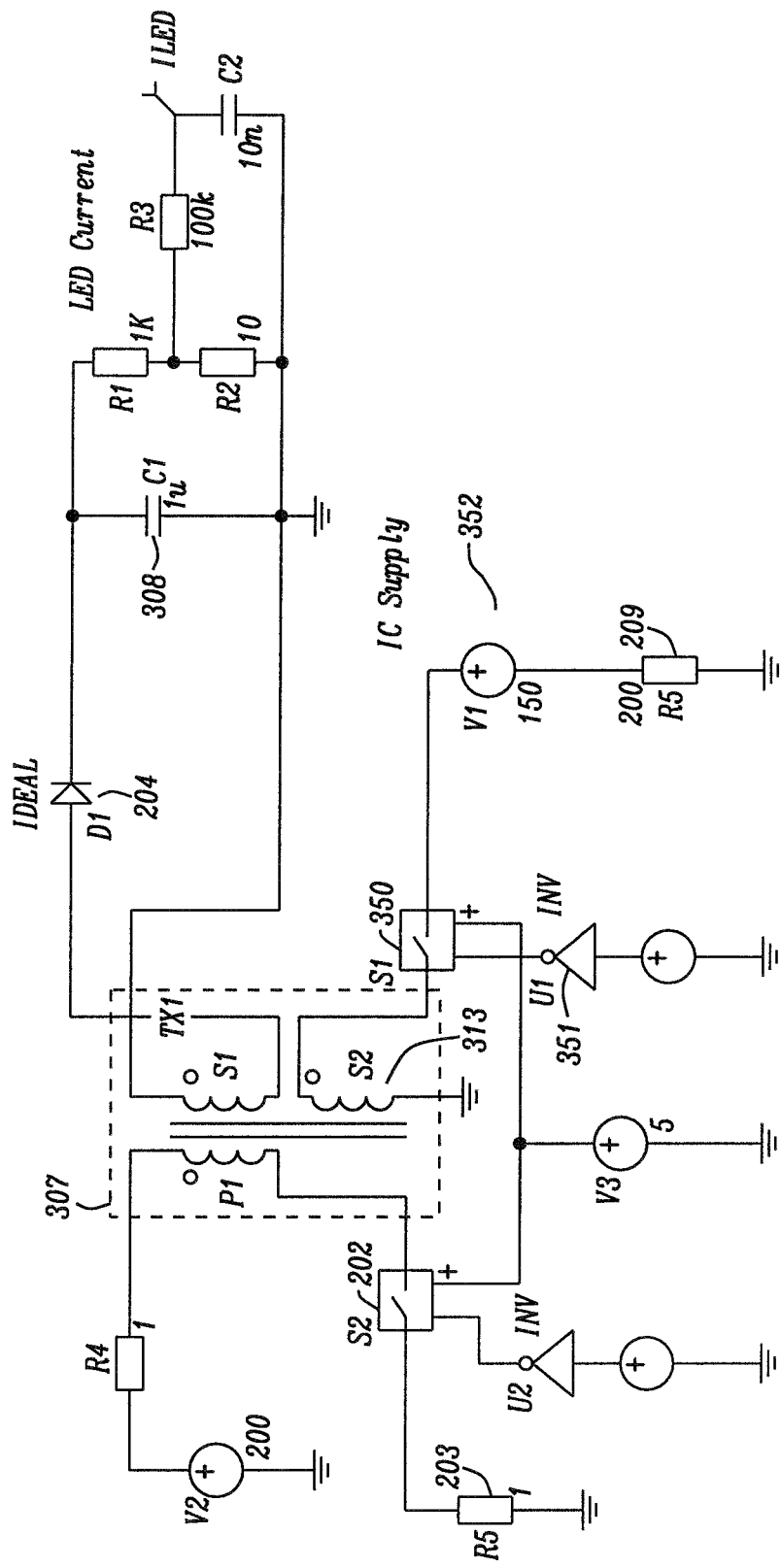
FIGS. 3a to 3c illustrate block diagrams of example circuit designs for an efficient recharging of the supply voltage capacitor.
Figure 3B:
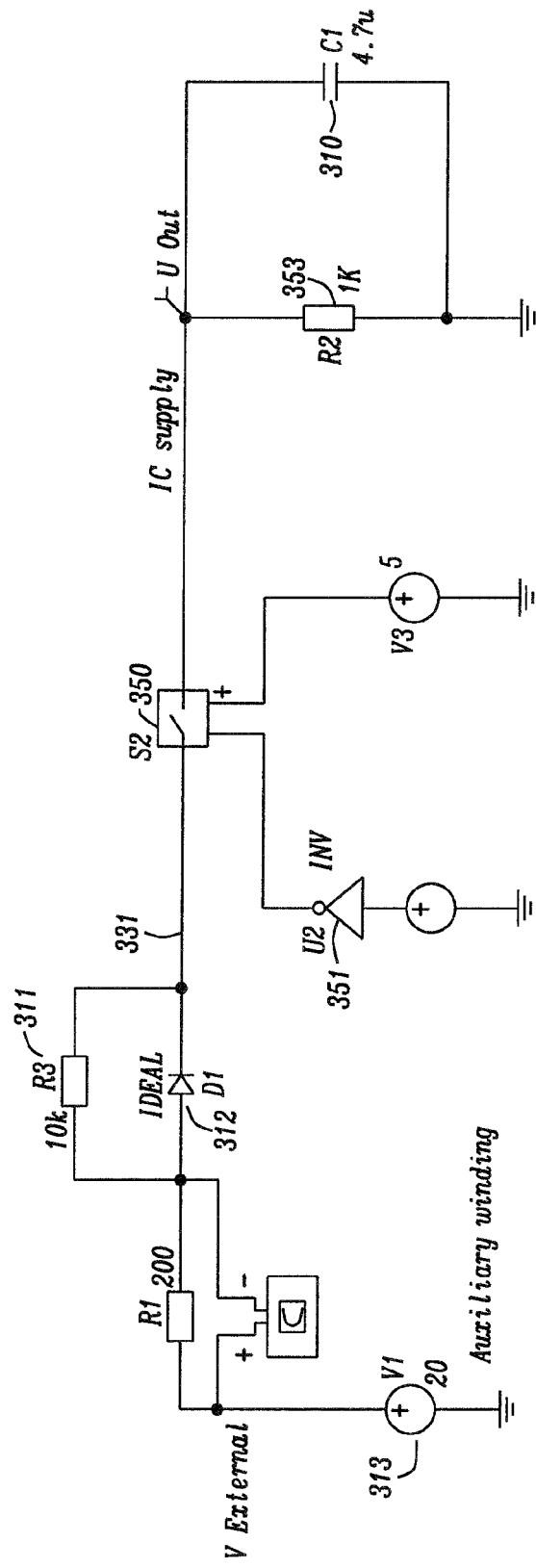

As indicated above, a start-up resistor 305 may be used to provide the controller 306 with energy from the rectified supply voltage 332. In particular, the energy drawn from the rectified supply voltage 332 may be used to charge the supply voltage capacitor 310 via an internal link within the controller 306 between the pin Vin and the pin Vcc of the controller 306. While the charging of the supply voltage capacitor 310 via the rectified supply voltage 332 enables a relatively fast start-up of the controller 306, the recharging of the supply voltage capacitor 310 (i.e. the maintenance of the supply voltage) via the start-up resistor 305 leads to significant losses of the driver circuit 300. FIGS. 3a and 3b illustrate example block diagrams of circuit arrangements which may be used to recharge the supply voltage capacitor 310 in an energy efficient manner.

FIG. 3a shows the transformer 307 of the flyback converter of FIG. 2. The transformer 307 comprises the auxiliary coil 313 which is coupled to a switch 350, referred to herein as the supply voltage switch (or the supply voltage transistor). The supply voltage switch 350 may be controlled via a switch driver 351. The supply voltage switch 350 may e.g. be an internal power switch 350 of the controller 306 of FIG. 2. The supply voltage switch 350 may be used to couple and/or to decouple the auxiliary coil 313 from the supply voltage circuitry 352 of FIG. 3a of the controller 306, e.g. from the supply voltage capacitor 310 of FIG. 2. As such, the energy provided via the flyback converter may be used to recharge the supply voltage capacitor 310, thereby maintaining the supply voltage Vcc. The supply voltage switch 350 of FIG. 3a may be opened and/or closed such that the supply voltage Vcc is maintained within a pre-determined voltage interval. In other words, through the control of the supply voltage switch 350, the supply voltage Vcc (provided e.g. by the supply voltage capacitor 310) may be maintained within the pre-determined voltage interval, thereby ensuring a reliable operation of the driver circuit 300.

A similar circuit arrangement is illustrated in FIG. 3b. The supply voltage switch 350 couples and/or decouples the auxiliary voltage 331 to/from the supply voltage capacitor 310 (which may be arranged in parallel to a resistor 353). As such, energy stored within the primary coil 314 of FIG. 2 of the transformer 307 may be used to recharge the supply voltage capacitor 310, thereby maintaining the supply voltage Vcc for the controller 306. As indicated above, the supply voltage switch 350 may be an internal switch of the controller 306, thereby providing an internal link between the Vaux port of the controller 306 (for receiving the auxiliary signal/voltage 331) and the Vcc port of the controller 306 (for coupling the supply voltage capacitor 310). When the supply voltage switch 350 is open, no energy is drawn by the auxiliary coil 313. On the other hand, when the supply voltage switch 350 is closed, the voltage supply capacitor 310 is recharged. Consequently, the circuit arrangements of FIGS. 3a and 3b allow for a recharging of the supply voltage capacitor 310 in an energy efficient manner.

Figure 3C:
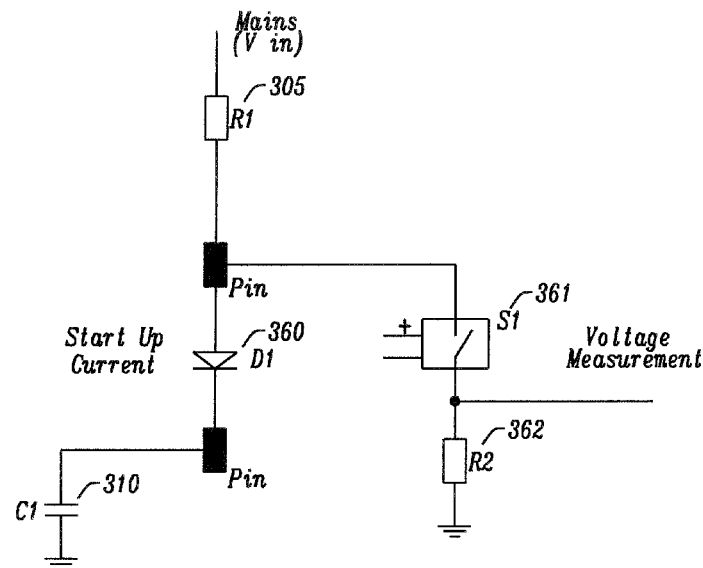

FIG. 3c illustrates a circuit arrangement which allows using the start-up resistor 305 not only for providing a start-up current to the controller 306 and to the supply voltage capacitor 310, but also for a measurement of the rectified supply voltage 332. For this purpose, an internal switch 361 (referred to herein as the start-up switch) of the controller 306 may be used to couple the start-up resistor 305 with a voltage measurement resistor 362, thereby building a voltage divider which may be used to sense the rectified supply voltage 332 of FIG. 2. The supply voltage capacitor 310 may be coupled to the start-up resistor 305 via a diode 360, thereby preventing a discharging of the supply voltage capacitor 310.

Figure 4A:
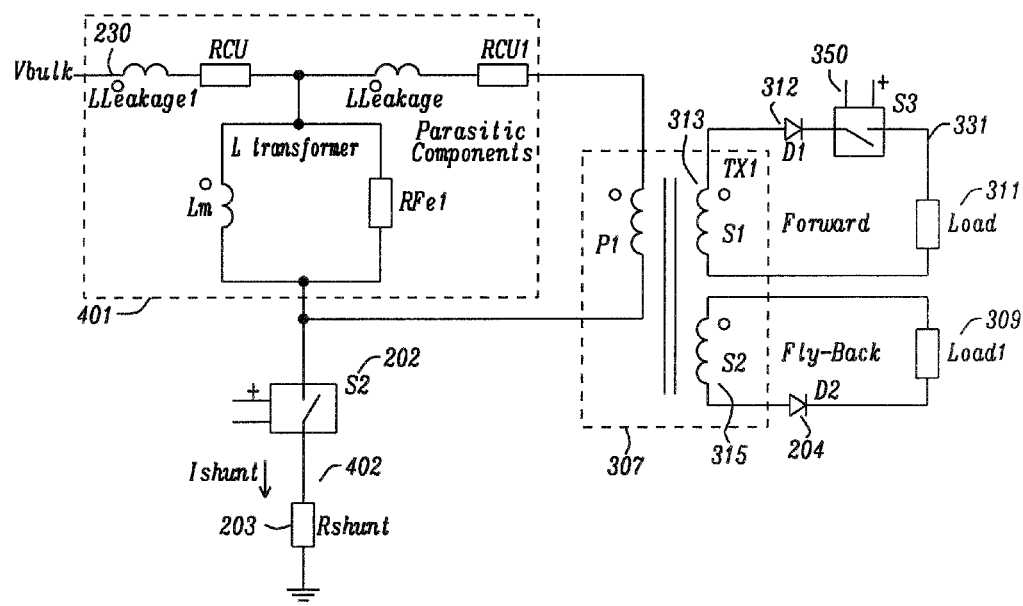
FIG. 4a shows a block diagram of an example circuit arrangement which allows for a charging of the supply voltage capacitor and for a measurement of the input and/or output voltage of the power converter.
Figure 4B:
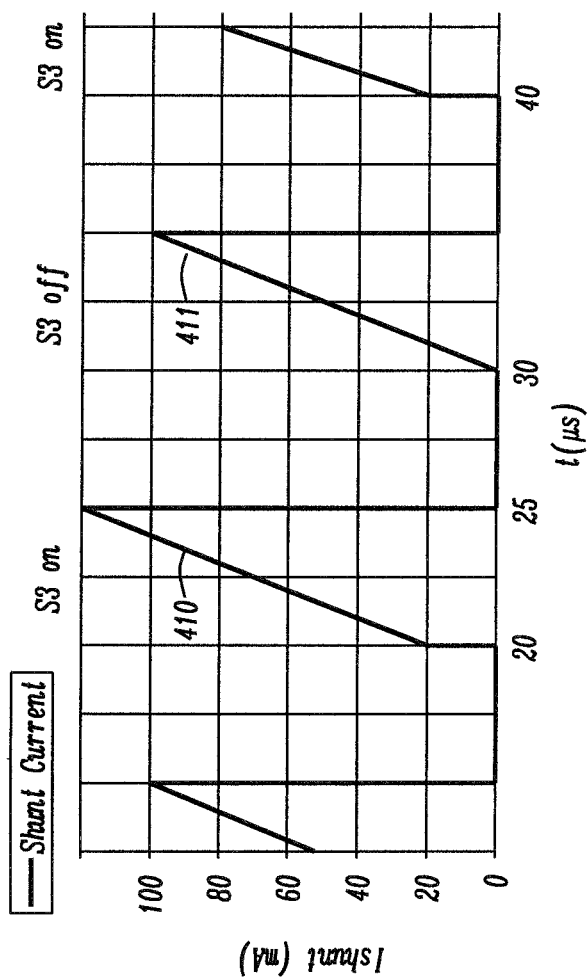
FIG. 4b illustrates the impact of the circuit arrangement of FIG. 4a on the current through the switch of the power converter.

FIGS. 4a and 4b illustrate how the auxiliary coil 313 and the supply voltage switch 350 may be used to also allow for a reliable determination of the current provided to the light source 309 via the secondary coil 315. FIG. 4a illustrates an excerpt of the driver circuit 300 which comprises a flyback circuit for supplying energy to the light source 309. Furthermore, the driver circuit 300 comprises a forward circuit which comprises the supply voltage switch 350. In addition, FIG. 4a illustrates various parasitic components 401 of the transformer 307, as well as the shunt current 402 through the switch 202 of the flyback converter. The operational mode of a circuit (e.g. the flyback mode or the forward mode) may depend on the orientation of the diodes 312, 204 and/or on the polarity of the respective coil 313, 315. In the forward mode, the diode 312 and the coil 313 are arranged such that a current through the primary coil 314 is directly translated into a current through the secondary coil 313 (when the switch 202 is closed). In the flyback mode, the diode 204 and the polarity of the coil 315 are arranged such that the energy transfer from the primary coil 314 to the secondary coil 315 occurs when the switch 202 is open.

FIG. 4b illustrates the shunt current 402 during time intervals when the switch 202 is in on-state (e.g. the time interval from 20 μs to 25 μs or the time interval from 30 μs to 35 μs) and during time intervals when the switch 202 is in off-state (e.g. the time interval from 25 μs to 30 μs). The supply voltage switch 350 may be in on-state (as is the case e.g. in the time interval from 20 μs to 25 μs) of the supply voltage switch 350 may be in off-state (as is the case e.g. in the time interval from 30 μs to 35 μs). It can be seen that when the supply voltage switch 350 is in on-state, the energy drawn by the auxiliary coil 313 leads to an offset of the shunt current 420 (see shunt current 410 in the time interval from 20 μs to 25 μs compared to the shunt current 411 in the time interval from 30 μs to 35 μs). As such, the recharging of the supply voltage capacitor 310 via the auxiliary coil 313

(when the supply voltage switch 350 is in on-state) leads to a distortion of the measurements which are made by the forward circuit. In view of this, it is proposed to use the supply voltage switch 350 to separate time intervals for measurements from time intervals for recharging the supply voltage capacitor 310. By doing this, it can be ensured that the recharging of the supply voltage capacitor 310 does not distort the measurements performed via the forward circuit.

By way of example, the supply voltage switch 350 may be put into the on-state only during every second (or less) on-period of the power converter switch 202, as illustrated in FIG. 4b. By doing this, the measurement of the shunt current 402 via the forward circuit (FIG. 4a) is not impacted by the current supplied to the supply voltage capacitor 310. The controller 306 may be configured to measure the shunt current 402 via the auxiliary signal 331, when the supply voltage switch 350 is in off-state (see e.g. current 411 of FIG. 4b). As a result, the controller 306 may determine a time interval T during which the power converter switch 202 is to be maintained in on-state (i.e. the controller 306 may determine a length T of an on-period of the switch 202) in order to supply an appropriate amount of energy to the light source 309.

The controller 306 may apply the same time interval T for a succeeding on-period of the power converter switch 202, during which the supply voltage switch 350 is in on-state and used for recharging of the supply voltage capacitor 310 (see e.g. current 410 of FIG. 4b). By applying the same time interval T, it is ensured that even though the auxiliary winding 313 is used to recharge the supply voltage capacitor 310, sufficient energy is stored within the primary coil 314 to be supplied to the light source 309. As such, a flickering effect of the light source 309 can be avoided, while at the same time allowing a recharging of the supply voltage via the auxiliary winding 313. In other words, by closing the supply voltage switch 350 only every second (or less) on-period of the power converter switch 202 and by using measurements performed during on-periods, for which the supply voltage switch 350 has been open, for the control of the power converter switch 202, it can be ensured that the drive current/drive voltage provided by the driver circuit 300 enables a stable/non-flickering operation of the light source 309, while at the same time allowing for a recharging of the supply voltage for the controller 306.

As outlined in the present document a start-up resistor 305 and/or an auxiliary winding 313 with a diode 312 may be used to provide the supply voltage VCC or the supply current Icc. As illustrated by FIG. 4b, there may be an influence between the LED current (i.e. the drive current) provided by the driver circuit 300 to the light source 309 and the IC current, i.e. the current provided to recharge the supply voltage capacitor 310. This may impact the LED current which may lead to an undesirable flickering effect of the light source 6. In a similar manner, it should be ensured that the Icc current provided to the controller 306 is stable (by ensuring that the supply voltage Vcc stays within a pre-determined voltage threshold), as variations of the Icc current may also lead to a flickering effect of the light source 6.

In the present document, it is proposed to perform the recharging of the supply voltage Vcc and the recharging of the output capacitor 308 on different phases of the flyback converter, thereby ensuring that the IC current does not influence the LED current. Furthermore, by an appropriate time management, it can be ensured that the LED current is measured at time instants when no IC current is provided, thereby allowing for an increased accuracy of the measurement. As outlined above, this ensures that a sufficient amount of energy/current is provided to the light source 309. This can be ensured even if the auxiliary winding 313 and the secondary winding 315 are operated in a flyback mode. In this case, the power converter switch 202 may be controlled such that during an on-period of the switch 202 sufficient energy is stored within the primary winding 314 to provide the IC current and the LED current during the off-period of the switch 202.

The start-up of the driver circuit 300 may be performed as follows. A source current may be generated from a start-up resistor (or several resistors) 305 and/or from a power transistor (e.g. a MOSFET) with a pull-up resistor on the gate voltage and a source controlled driver inside the controller 306. The controller 306 may use an on-chip high voltage (e.g. 32V) switch to couple (e.g. connect) the source current to the supply voltage capacitor 310 and to charge up the supply voltage capacitor 310 to a first threshold voltage. Upon detection of the first threshold voltage, the first and/or second converter stage may be activated for a first operating time until the supply voltage capacitor 310 is discharged to a second threshold voltage (which is lower than the first threshold voltage). When reaching the second threshold voltage, the first and/or second converter stage may be de-activated. Furthermore, a source current may be drawn again to recharge the supply voltage capacitor 310 up to the first threshold voltage, upon which the first and/or second converter stage may be re-activated. This cycle may be repeated until the bus voltage (i.e. the input voltage 230) reaches a minimum operating voltage for the LED converter stage (i.e. for the flyback converter of FIG. 2). At this point the supply voltage for the controller 306 is sufficient and the driver circuit 300 can enter its normal operation mode. Furthermore, at this point, a recharging of the supply voltage capacitor 310 via the auxiliary coil 313 of the transformer 307 may be performed.

As indicated above, the start-up current can be provided via a start-up resistor from different places within the driver circuit 300 and/or using a source controlled transistor. In case of a two-stage power converter (as illustrated e.g. in FIG. 2), the start-up resistor may be coupled to the so-called bulk voltage, i.e. the voltage between the output of the first converter stage and the input to the second converter stage (referred to as the input voltage 230 in FIG. 2). The bulk voltage is typically maintained by a bulk capacitor 370 (see FIG. 2). The energy stored within the bulk capacitor 370 may be used to charge and/or re-charge the supply voltage capacitor 310 (e.g. by coupling the bulk capacitor 370 via a resistor with the supply voltage capacitor 310). By doing this, certain periods of interruption of the mains supply 330 may be bridged using the energy stored in the bulk capacitor 370 to recharge the supply voltage capacitor 310 (e.g. when the controller 306 is operated in a low power mode). As the voltage at the bulk capacitor 370 may be significantly higher than the supply voltage, a Zener function (e.g. a Zener diode) at the Vcc may be added to protect the controller 306 from over-voltage.

As outlined above, it is proposed in the present document to use a supply voltage switch 350 of FIG. 3a for the Icc supply, i.e. for providing and/or for maintain the supply voltage Vcc within a pre-determined voltage interval. The supply voltage switch 350 may be arranged in series with an auxiliary winding 313 of the transformer 307, thereby selectively coupling the auxiliary winding 313 to the supply voltage Vcc (e.g. to the supply voltage capacitor 310).

As outlined in the present document, the supply voltage switch 350 may be closed at every second control pulse only, i.e. the supply voltage switch 350 may be closed only during every second on-period of the power converter switch 202 only. The pulse width for the switch 202 (i.e. the time interval T during which the switch 202 is kept open) may be determined during an on-period for which the supply voltage switch 350 is open. This pulse width (i.e. this time interval T) may be used for the subsequent on-period for which the supply voltage switch 350 is closed. This means that in the forward operation of the transformer 307 the timing T is maintained constant, such that in the flyback operation the LED 309 receives sufficient energy even if the IC (i.e. the controller 306) takes more current (when the supply voltage switch 350 is closed). The energy to the LED 309 is transferred, when the power converter switch 202 is open. The benefit of this alternating operation is, that the LED current will not go to zero, even if an IC current is provided to re-charge the supply voltage capacitor 310. This alternating operation can be performed at the phase, where the LED is supplied (i.e. in flyback mode) or in the forward mode. In the forward mode the IC supply will be decoupled from the LEC current.

As outlined in the context of FIG. 3c, a start-up resistor 305 from a high voltage (e.g. from the rectified supply voltage 332 may be used for multiple purposes. By doing this, the number of components of the driver circuit 300 can be reduced. In particular, the start-up resistor 305 (or any of the high voltage resistors of the driver circuit 300) may be used for start-up purposes and for voltage measurement purposes (e.g. using a voltage divider).

Figure 5A:
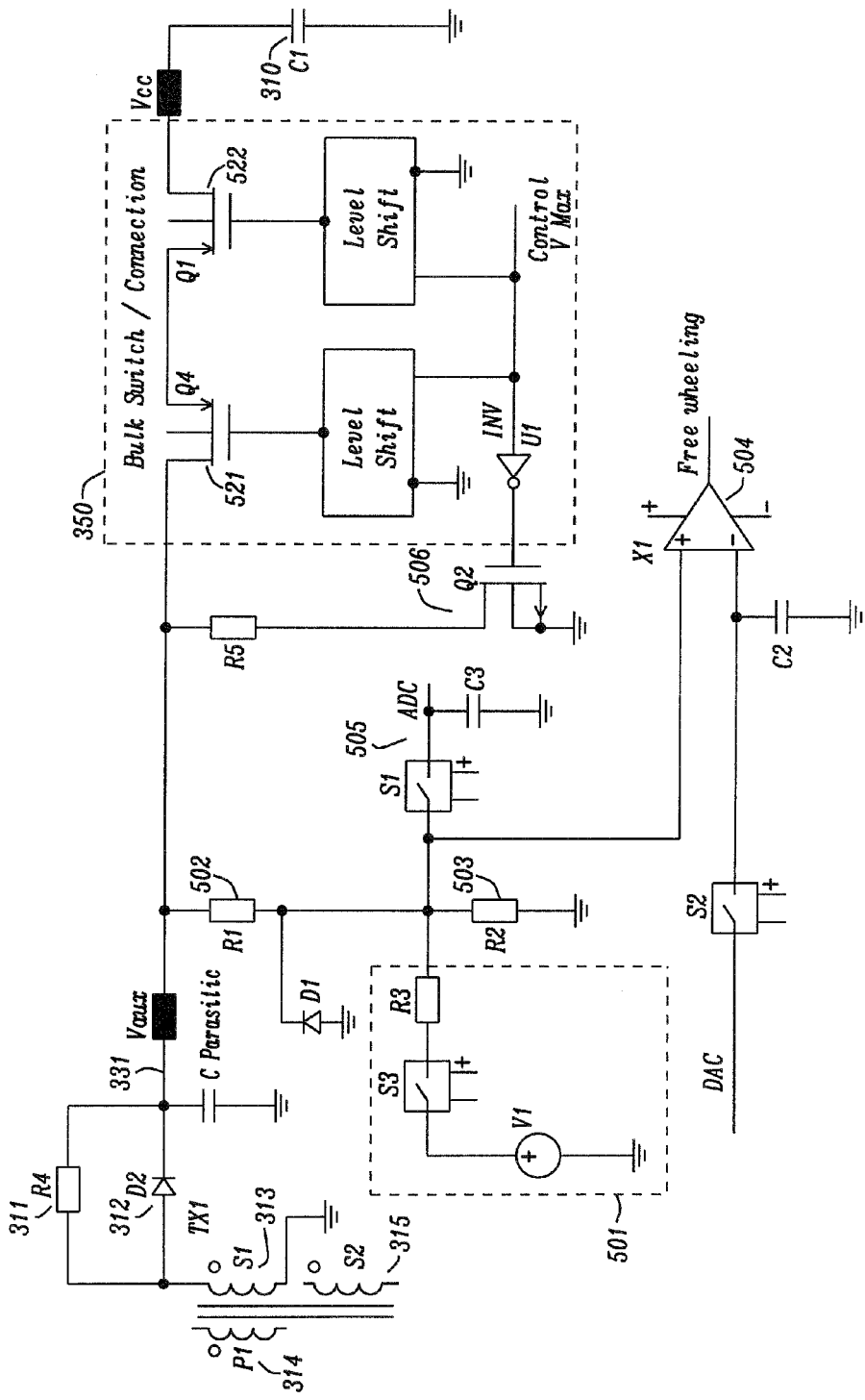
FIGS. 5a to 5d show block diagrams of example circuit arrangements which allow for a charging of the supply voltage capacitor and for a measurement of the input and/or output voltage of the power converter.

FIGS. 5a to 5d show block diagrams of example circuit arrangements which enable the recharging of the supply voltage capacitor 310 via the auxiliary coil 313, and which allow for a measurement of the input voltage 230/output voltage 231 and/or of the current 402 through the power converter switch 202. FIG. 5a shows the transformer 307 comprising the coils 313, 314, 315. The auxiliary coil 313 may be coupled to an auxiliary pin of the controller 306 via the auxiliary diode 312. The components of the circuit arrangement which lie between the auxiliary pin Vaux of the controller 306 and the supply voltage pin Vcc of the controller 306 may be implemented within the integrated circuit of the controller 306. The circuit arrangement comprises the supply voltage switch 350 which may be implemented using two transistors 521, 522. The transistors 521, 522 may be switched in a coordinated manner, in order to open and/or close the resulting supply voltage switch 350. In the illustrated example, the transistors 521, 522 are implemented as bulk switches. When using bulk switches, it may be possible to implement the supply voltage switch 350 using only a single transistor 521, 522. The two transistors 521, 522 may be required to avoid a reverse current from the supply voltage capacitor 310 to the auxiliary coil 313. The reverse current may be due to a body diode of the transistor 521. An alternative to using a second transistor 522 may be to use a diode which is configured to block the reverse current.

Furthermore, the circuit arrangement comprises voltage sensing means 502, 503 of FIG. 5a configured to sense the auxiliary voltage 331. In the illustrated example, the voltage sensing means 502, 503 are implemented as a voltage divider comprising the resistors 502, 503. Furthermore, an offset unit 501 may be provided which is configured to offset the sensed voltage (e.g. for cases where the auxiliary voltage 331 is negative). The sensed voltage may be provided via a sample-and-hold circuit 505 and/or via a comparator 504. In addition, the circuit arrangement may comprise a switch 506 configured to discharge parasitic capacitances at the input of the controller 306 (i.e. at the Vaux pin of the controller 306).

The circuit arrangement of FIG. 5a allows recharging the supply voltage capacitor 310 by closing the supply voltage switch 350. Furthermore, the circuit arrangement of FIG. 5a allows measuring the auxiliary voltage 331, when the supply voltage switch 350 is open.

Figure 5B:
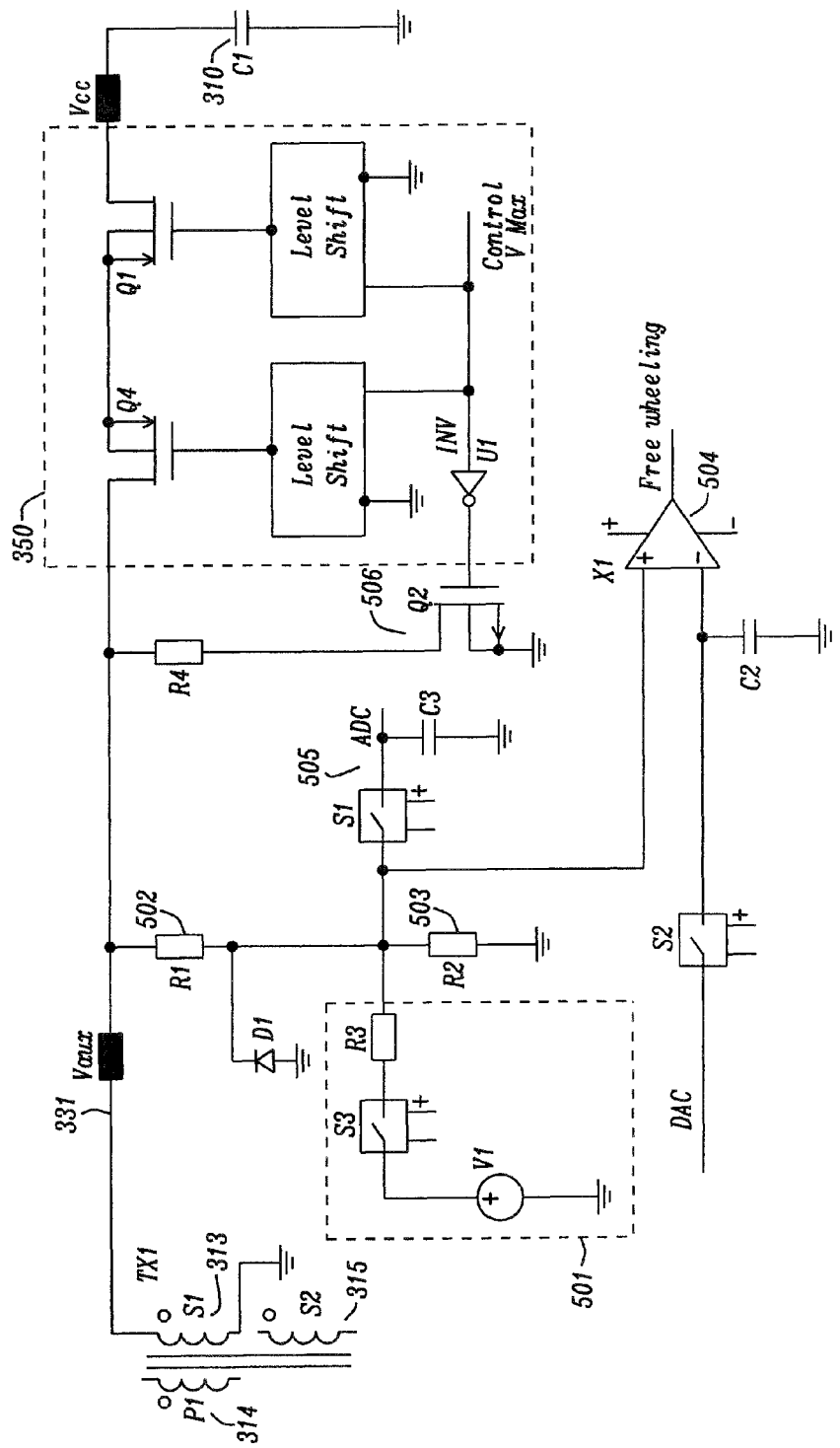

FIG. 5b shows another circuit arrangement. The circuit arrangement of FIG. 5b does not comprise the auxiliary diode 312. The (half wave) rectification function provided by the auxiliary diode 312 may instead be provided by the supply voltage switch 350 (e.g. within the controller 306 of FIG. 2). In particular, the supply voltage switch 350 may be controlled such that the supply voltage switch 350 is only opened when the auxiliary signal 331 is positive, thereby preventing a discharging of the supply voltage capacitor 310.

Figure 5C:
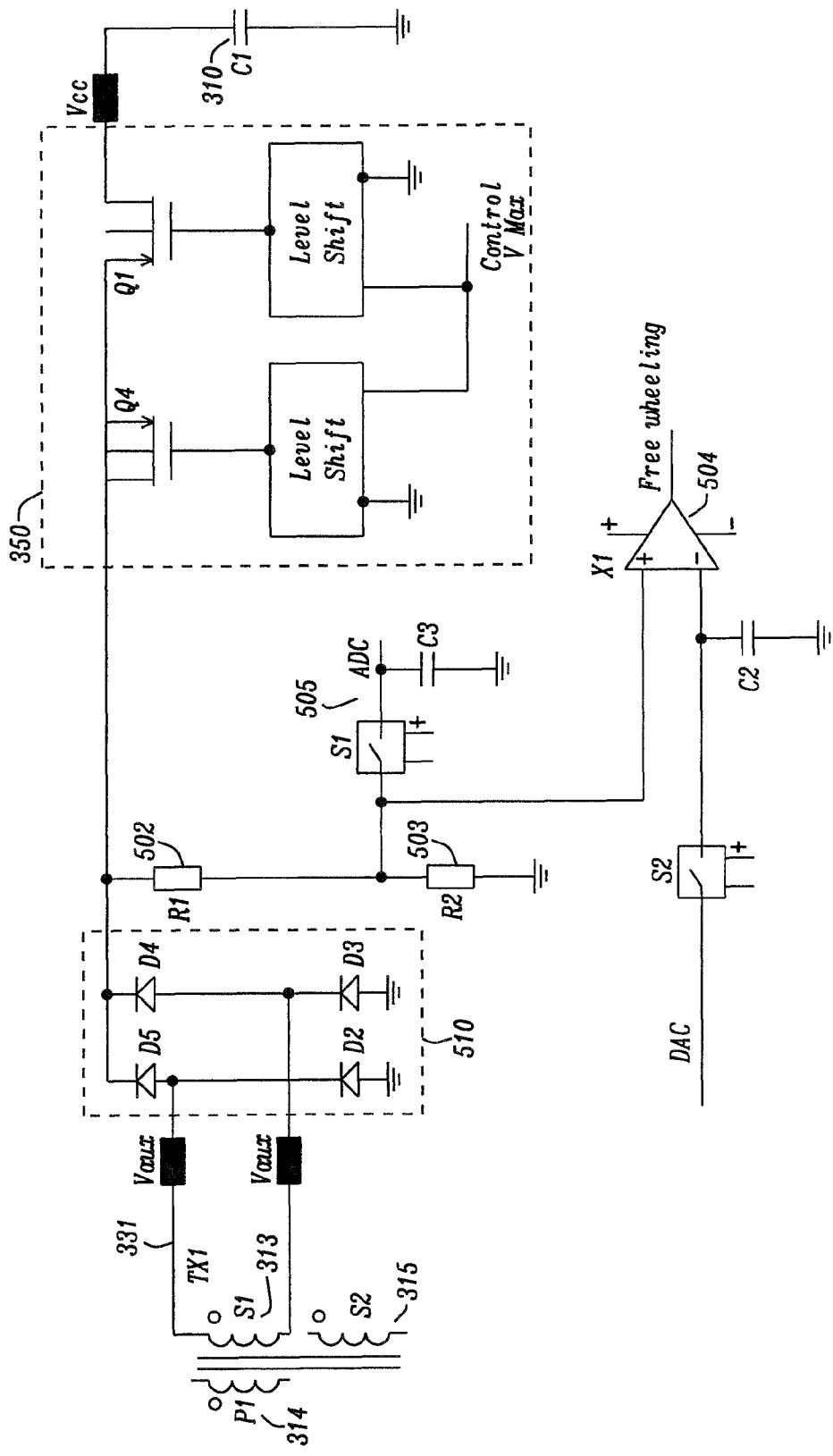

FIG. 5c illustrates a circuit arrangement comprising a full wave rectifier 510 (replacing the half wave rectifying auxiliary diode 312). The rectifier 510 ensures that the rectified auxiliary voltage 331 is always positive (and by consequence is always available for recharging of the supply voltage capacitor 310). By doing this, the energy which is supplied to the supply voltage capacitor can be increased, thereby ensuring a reliable operation of the driver circuit, even when the mains electricity supply is submitted to a dimmer.

Figure 5D:
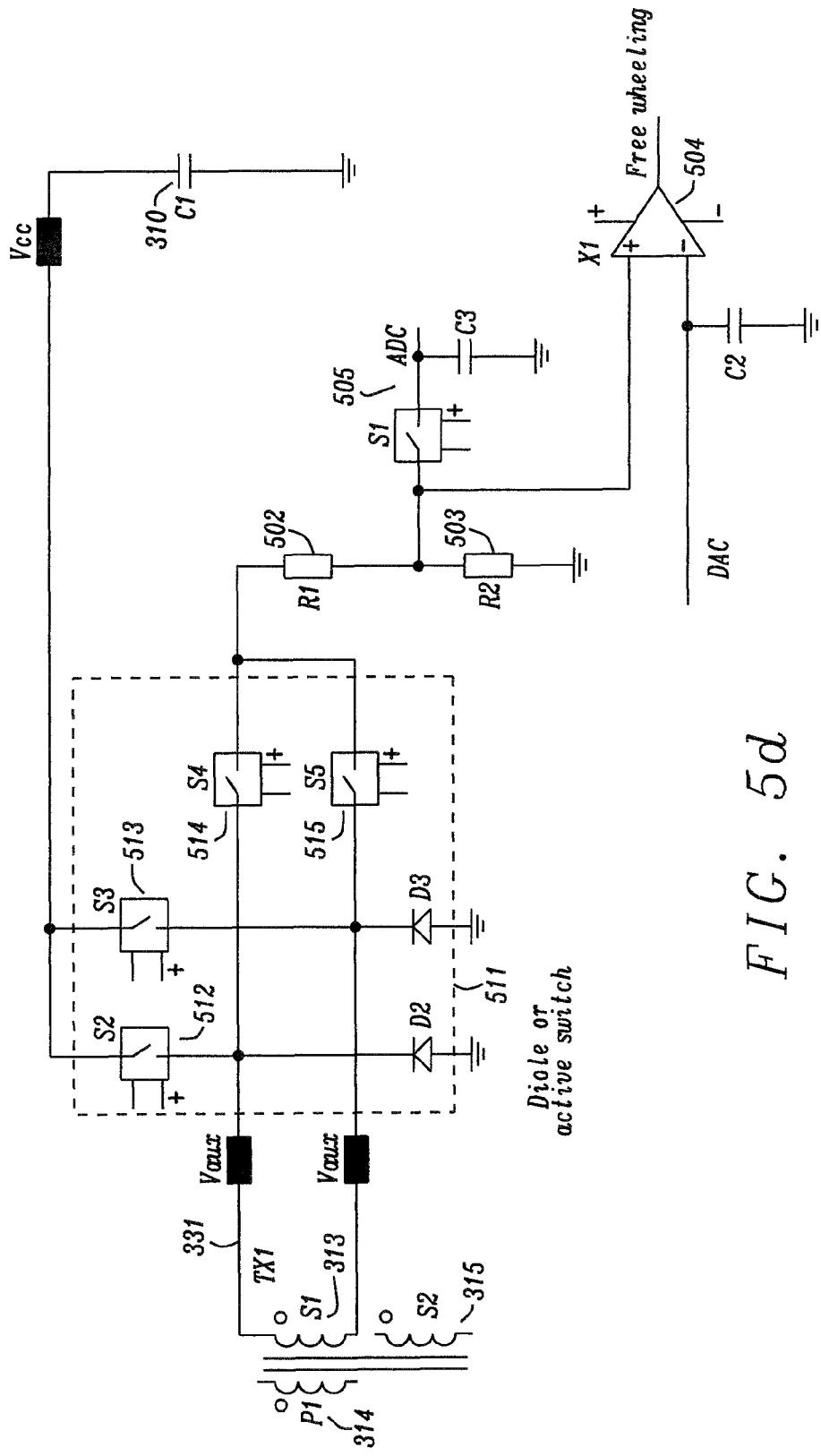

FIG. 5c shows a passive rectifier 510 comprising diodes. FIG. 5d shows a similar circuit arrangement comprising an active rectifier 511 comprising switches 512, 513, 514, 515. By using controllable switches 512, 513, 514, 515 for the rectifier 511, the active switches 512, 513, 514, 515 of the rectifier 511 may be used to implement the supply voltage switch 350. In particular, the switches 512, 513 may be used to couple the auxiliary voltage 331 to/from the supply voltage capacitor 310. The active switches 512, 513, 514, 515 of the rectifier 511 may also be used to change the operational mode of the auxiliary coil 313. In particular, the operational mode may be changed between a flyback mode and a forward mode.

Figure 6:
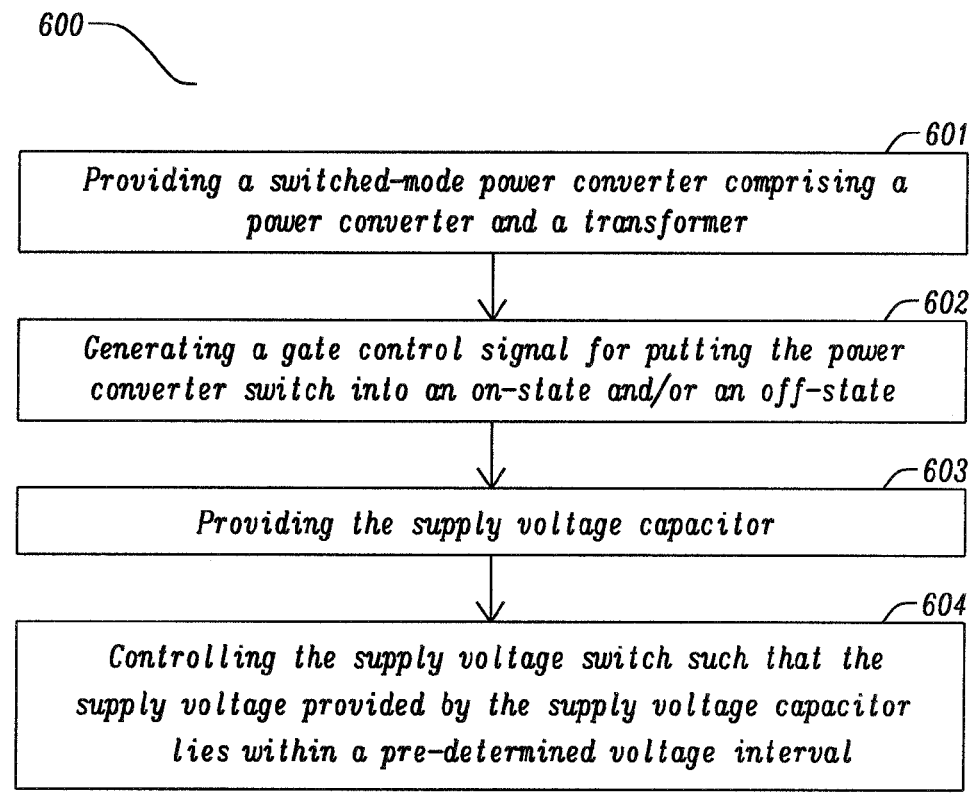
FIG. 6 shows a flow diagram of an example method for recharging a supply voltage capacitor.

FIG. 6 shows a flow chart of an example method 600 for providing (e.g. for recharging) a supply voltage. The method 600 may comprise the step of providing 601 a switched-mode power converter comprising a power converter switch 202 and a transformer 307. The switched-mode power converter is typically configured to convert the input voltage 230 at the input of the switched-mode power converter into the output voltage 231 at the output of the switched-mode power converter. The method 600 may comprise the step of generating 602 a gate control signal 232 for putting the power converter switch 202 into an on-state and/or an off-state. Furthermore, the method may comprise the step of providing 603 the supply voltage capacitor 310. The primary coil 314 of the transformer 307 may be arranged in series with the power converter switch 202. The secondary coil 315 of the transformer 307 may be configured to provide the output voltage 231. The auxiliary coil 313 of the transformer 307 may be coupled to the supply voltage capacitor 310 via a supply voltage switch 350. The method 600 may comprise the step of controlling 604 the supply voltage switch 350 such that the supply voltage provided by the supply voltage capacitor 310 lies within a pre-determined voltage interval.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A driver circuit for a solid state light source, wherein the driver circuit comprises
   a switched-mode power converter comprising a power converter switch and a transformer; wherein the switched-mode power converter is configured to convert an input voltage at an input of the switched-mode power converter into an output voltage at an output of the switched-mode power converter;
   a controller configured to generate a gate control signal for putting the power converter switch into an on-state and/or an off-state;
   a supply voltage capacitor coupled to the controller and configured to provide a supply voltage to the controller; wherein
      a primary coil of the transformer is arranged in series with the power converter switch;
      a secondary coil arrangement of the transformer is configured to provide the output voltage;
      the secondary coil arrangement is coupled to the supply voltage capacitor via a supply voltage transistor;
      the controller is configured to control the supply voltage transistor in a switched mode to be open or closed such that the supply voltage provided by the supply voltage capacitor lies within a pre-determined voltage interval for operation of the controller;
      the controller is further configured to control the supply voltage transistor in the switched mode to separate time intervals for measuring an auxiliary signal indicative of a current through the power converter switch, from time intervals for recharging the supply voltage capacitor; and
      the controller is further configured to determining the auxiliary signal at a first time interval, when the supply voltage transistor is open.

2. The driver circuit of claim 1, wherein the secondary coil arrangement comprises
   a secondary coil of the transformer configured to provide the output voltage; and
   an auxiliary coil of the transformer coupled to the supply voltage capacitor via the supply voltage transistor.

3. The driver circuit of claim 2, wherein the secondary coil is arranged in series with a secondary switch, e.g. a secondary diode, such that the secondary coil is operated in a flyback mode with respect to the primary coil.

4. The driver circuit of claim 2, wherein the auxiliary coil is arranged in series with an auxiliary switch, e.g. an auxiliary diode, such that the auxiliary coil is operated in a forward mode with respect to the primary coil.

5. The driver circuit of claim 2, wherein the auxiliary coil is arranged in series with an auxiliary switch, e.g. an auxiliary diode, such that the auxiliary coil is operated in a flyback mode with respect to the primary coil.

6. The driver circuit of claim 2, wherein
   the controller is configured to generate the gate control signal for putting the power converter switch into the on-state and the off-state in an alternating manner;
   the driver circuit comprises current sensing means configured to sense a current through the auxiliary coil, thereby yielding the auxiliary signal; and
   the controller is configured to determine a duration of the on-state of the power converter switch based on the auxiliary signal.

7. The driver circuit of claim 6, wherein the controller is configured to
   determine a first duration of the on-state of the power converter switch based on the auxiliary signal at the first time interval;
   maintain the power converter switch in on-state for the first duration at a succeeding second time interval, when the supply voltage transistor is closed.

8. The driver circuit of claim 1, wherein the supply voltage transistor is an internal power transistor of the controller.

9. The driver circuit of claim 1, wherein the controller is configured to
   control the power converter switch to be in alternating on-periods, where the power converter switch is in on-state, and off-periods, where the power converter switch is in off-state; and
   control the supply voltage transistor to be in off-state at least for every second on-period of the power converter switch.

10. The driver circuit of claim 1, further comprising
    a start-up resistor configured to couple the input of the switched-mode power converter to the supply voltage capacitor; and
    a start-up switch and a measurement resistor arranged in parallel to the supply voltage capacitor such than when the start-up switch is closed, the start-up resistor and the measurement resistor form a voltage divider.

11. The driver circuit of claim 2, wherein the controller
    is configured to receive the auxiliary signal indicative of a voltage drop at the auxiliary coil; and/or
    comprises a rectification unit configured to rectify the auxiliary signal; and/or
    comprises a voltage divider arranged in parallel to the supply voltage transistor and the supply voltage capacitor, and configured to sense the auxiliary signal, when the supply voltage transistor is open.

12. The driver circuit of claim 11, wherein the rectification unit comprises a plurality of rectification switches configured to switch an operational mode of the auxiliary coil with respect to the primary coil between a flyback mode and a forward mode.

13. The driver circuit of claim 2, further comprising a discharging transistor arranged in parallel with the auxiliary coil and configured to discharge a parasitic capacitance at an input of the controller.

14. A light bulb assembly comprising:
    a housing;
    a solid state light source, located within the housing;
    an electrical connection module, attached to the housing, and adapted for connection to a mains supply; and
    a driver circuit located within the housing, connected to receive an electricity supply signal from the electrical connection module, and operable to supply an output voltage to the light source, wherein the driver circuit comprises
    a switched-mode power converter comprising a power converter switch and a transformer; wherein the switched-mode power converter is configured to convert an input voltage at an input of the switched-mode power converter into an output voltage at an output of the switched-mode power converter;

a controller configured to generate a gate control signal for putting the power converter switch into an on-state and/or an off-state;

a supply voltage capacitor coupled to the controller and configured to provide a supply voltage to the controller; wherein a primary coil of the transformer is arranged in series with the power converter switch;

a secondary coil arrangement of the transformer is configured to provide the output voltage;

the secondary coil arrangement is coupled to the supply voltage capacitor via a supply voltage transistor;

the controller is configured to control the supply voltage transistor in a switched mode to be open or closed such that the supply voltage provided by the supply voltage capacitor lies within a pre-determined voltage interval for operation of the controller;

the controller is further configured to control the supply voltage transistor in the switched mode to separate time intervals for measuring an auxiliary signal indicative of a current through the power converter switch, from time intervals for recharging the supply voltage capacitor; and the controller is further configured to determining the auxiliary signal at a first time interval, when the supply voltage transistor is open.

15. A method for providing a supply voltage, the method comprising the steps of:

providing a switched-mode power converter comprising a power converter switch and a transformer; wherein the switched-mode power converter converts an input voltage at an input of the switched-mode power converter into an output voltage at an output of the switched-mode power converter;

generating a gate control signal for putting the power converter switch into an on-state and/or an off-state;

providing a supply voltage capacitor; wherein a primary coil of the transformer is arranged in series with the power converter switch;

a secondary coil arrangement of the transformer provides the output voltage;

the secondary coil arrangement is coupled to the supply voltage capacitor via a supply voltage transistor;

controlling the supply voltage transistor in a switched mode to be open or closed such that the supply voltage provided by the supply voltage capacitor lies within a pre-determined voltage interval;

controlling the supply voltage transistor in the switched mode to separate time intervals for measuring an auxiliary signal indicative of a current through the power converter switch, from time intervals for recharging the supply voltage capacitor; and determining the auxiliary signal at a first time interval, when the supply voltage transistor is open.

16. The method for providing a supply voltage of claim 15, further comprising the steps of:

providing the output voltage by a secondary coil of the transformer; and coupling an auxiliary coil of the transformer to the supply voltage capacitor via the supply voltage transistor.

17. The method for providing a supply voltage of claim 16, wherein the secondary coil is arranged in series with a secondary switch, e.g. a secondary diode, such that the secondary coil is operated in a flyback mode with respect to the primary coil.

18. The method for providing a supply voltage of claim 16, wherein the auxiliary coil is arranged in series with an auxiliary switch, e.g. an auxiliary diode, such that the auxiliary coil is operated in a forward mode with respect to the primary coil.

19. The method for providing a supply voltage of claim 16, wherein the auxiliary coil is arranged in series with an auxiliary switch, e.g. an auxiliary diode, such that the auxiliary coil is operated in a flyback mode with respect to the primary coil.

20. The method for providing a supply voltage of claim 16, further comprising the steps of:

generating the gate control signal for putting the power converter switch into the on-state and the off-state in an alternating manner, by the controller, sensing a current through the auxiliary coil, thereby yielding the auxiliary signal by the driver circuit, determining a duration of the on-state of the power converter switch based on the auxiliary signal by the controller.

21. The method for providing a supply voltage of claim 20, further comprising the steps of:

determining a first duration of the on-state of the power converter switch based on the auxiliary signal at the first time interval; and maintaining the power converter switch in on-state for the first duration at a succeeding second time interval, when the supply voltage transistor is closed.

22. The method for providing a supply voltage of claim 15, wherein the supply voltage transistor is an internal power transistor of the controller.

23. The method for providing a supply voltage of claim 15, further comprising the steps of:

controlling the power converter switch to be in alternating on-periods, where the power converter switch is in on-state, and off-periods, where the power converter switch is in off-state; and controlling the supply voltage transistor to be in off-state at least for every second on-period of the power converter switch.

24. The method for providing a supply voltage of claim 15, further comprising the steps of:

coupling the input of the switched-mode power converter to the supply voltage capacitor by a start-up resistor; and providing a start-up switch and a measurement resistor arranged in parallel to the supply voltage capacitor such than when the start-up switch is closed, the start-up resistor and the measurement resistor form a voltage divider.

25. The method for providing a supply voltage of claim 16, further comprising the steps of:

receiving the auxiliary signal indicative of a voltage drop at the auxiliary coil by the controller; and/or rectifying the auxiliary signal by a rectification unit; and/or providing a voltage divider arranged in parallel to the supply voltage transistor and the supply voltage capacitor, and to sense the auxiliary signal, when the supply voltage transistor is open.

26. The method for providing a supply voltage of claim 25, wherein the rectification unit comprises a plurality of rectification switches to switch an operational mode of the auxiliary coil with respect to the primary coil between a flyback mode and a forward mode.

27. The method for providing a supply voltage of claim 16, further comprising the step of:

providing a discharging transistor arranged in parallel with the auxiliary coil and to discharge a parasitic capacitance at an input of the controller.

* * * * *